US012561899B2

(12) United States Patent
Bischoff et al.

(10) Patent No.: US 12,561,899 B2
(45) Date of Patent: Feb. 24, 2026

(54) VECTOR GRAPHIC PARSING AND TRANSFORMATION ENGINE

(71) Applicant: Pro Quick Draw LLC, St. Paul, MN (US)

(72) Inventors: Andrew Erich Bischoff, Baltimore, MD (US); Troy Bigelow, Fort Mill, SC (US)

(73) Assignee: Pro Quick Draw LLC, St. Paul, MN (US)

( * ) Notice: Subject to any disclaimer, the term of this patent is extended or adjusted under 35 U.S.C. 154(b) by 499 days.

(21) Appl. No.: 17/463,439

(22) Filed: Aug. 31, 2021

(65) Prior Publication Data

US 2022/0068020 A1 Mar. 3, 2022

Related U.S. Application Data

(60) Provisional application No. 63/073,128, filed on Sep. 1, 2020.

(51) Int. Cl.
| | |
|---|---|
| *G06T 17/00* | (2006.01) |
| *G06F 18/243* | (2023.01) |
| *G06T 7/60* | (2017.01) |
| *G06T 7/70* | (2017.01) |
| *G06T 19/20* | (2011.01) |

(52) U.S. Cl.
CPC ........... *G06T 17/00* (2013.01); *G06F 18/243* (2023.01); *G06T 7/60* (2013.01); *G06T 7/70* (2017.01); *G06T 19/20* (2013.01)

(58) Field of Classification Search
CPC . G06T 17/00; G06T 7/60; G06T 19/20; G06F 18/243
See application file for complete search history.

(56) References Cited

U.S. PATENT DOCUMENTS

| | | | | |
|---|---|---|---|---|
| 2014/0162743 | A1* | 6/2014 | Meyer | A63F 13/58 463/4 |
| 2021/0354017 | A1* | 11/2021 | Friehauf | G06N 3/045 |

OTHER PUBLICATIONS

"3D Graphics Overview", WPF .NET Framework, Dec. 4, 2020, p. 1-17.

(Continued)

*Primary Examiner* — Matthew Salvucci
(74) *Attorney, Agent, or Firm* — Forsgren Fisher McCalmont DeMarea Tysver; Daniel A. Tysver; James M. Urzedowski

(57) ABSTRACT

A system and method are presented that scans a vector graphics file for image elements that represent individual objects and for image elements that represent movement or actions for those objects. Objects, each possibly represented by multiple shapes, arrows, lines, or shading, are identified as parsed into a standard class definition. In one embodiment, the class definitions and the rule set applied to perform this parsing are pre-defined according to the content of the SVG file. The class definition can then be used to create input into an API for a 3D graphics engine to render the objects with their associated movements.

14 Claims, 13 Drawing Sheets

(56)  References Cited

OTHER PUBLICATIONS

"3D Transformations Overview", WPF .NET Framework, Dec. 4, 2020, p. 1-14.
"Animation Overview", WPF .NET Framework, Aug. 12, 2021, p. 1-23.
"Maximize WPF 3D Performance", WPF .NET Framework, Sep. 4, 2020, p. 1-7.
"Path Animations Overview", WPF .NET Framework, Sep. 4, 2020, p. 1-9.
"Timing Events Overview", WPF .NET Framework, Sep. 4, 2020, p. 1-6.

* cited by examiner

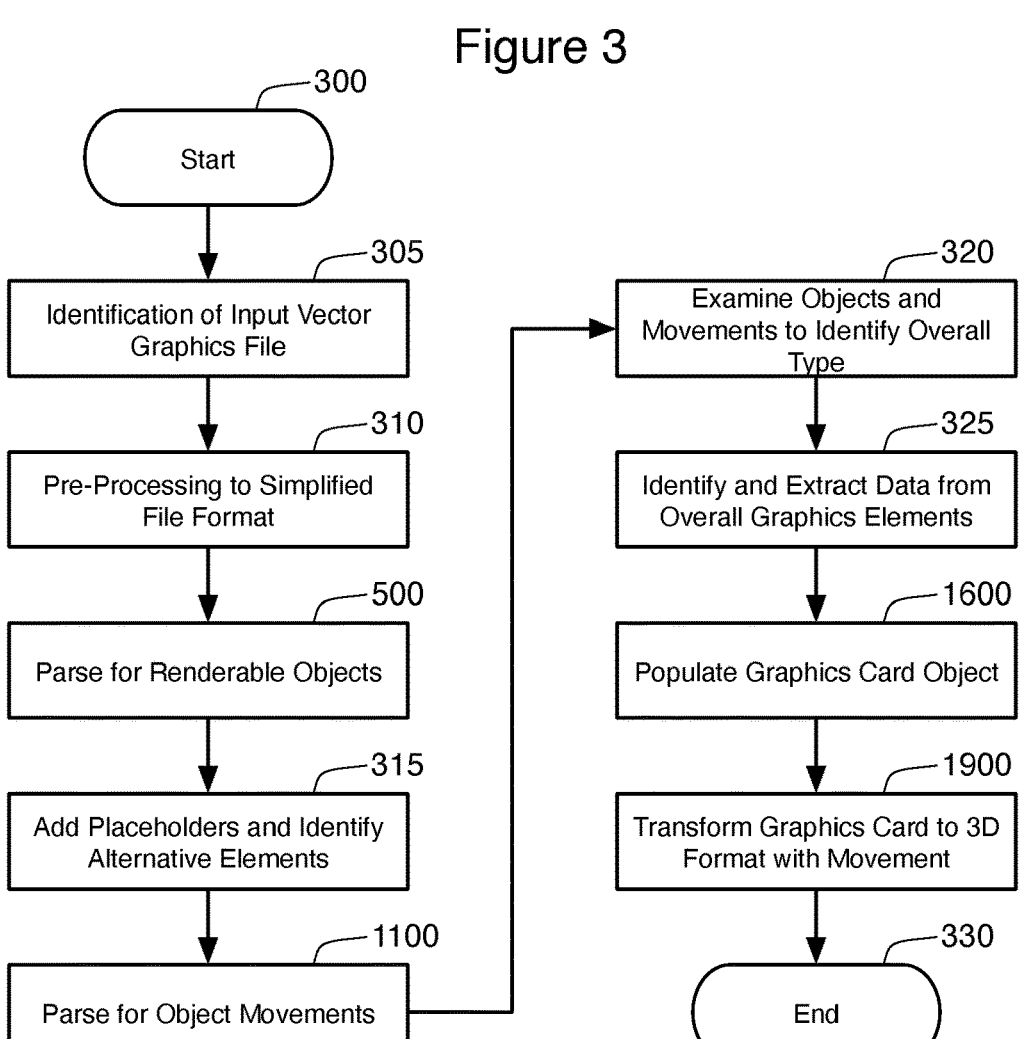

```
                    ┌─300
              ┌─────────────┐
              │    Start    │
              └─────────────┘
                     │
        ┌─305                      ┌─320
┌──────────────────────┐   ┌──────────────────────┐
│ Identification of     │   │ Examine Objects and   │
│ Input Vector          │   │ Movements to Identify │
│ Graphics File         │   │ Overall Type          │
└──────────────────────┘   └──────────────────────┘
          │                          │
        ┌─310                      ┌─325
┌──────────────────────┐   ┌──────────────────────┐
│ Pre-Processing to     │   │ Identify and Extract  │
│ Simplified File       │   │ Data from Overall     │
│ Format                │   │ Graphics Elements     │
└──────────────────────┘   └──────────────────────┘
          │                          │
        ┌─500                      ┌─1600
┌──────────────────────┐   ┌──────────────────────┐
│ Parse for Renderable  │   │ Populate Graphics     │
│ Objects               │   │ Card Object           │
└──────────────────────┘   └──────────────────────┘
          │                          │
        ┌─315                      ┌─1900
┌──────────────────────┐   ┌──────────────────────┐
│ Add Placeholders and  │   │ Transform Graphics    │
│ Identify Alternative  │   │ Card to 3D Format     │
│ Elements              │   │ with Movement         │
└──────────────────────┘   └──────────────────────┘
          │                          │
        ┌─1100                     ┌─330
┌──────────────────────┐   ┌──────────────────────┐
│ Parse for Object      │   │        End            │
│ Movements             │   └──────────────────────┘
└──────────────────────┘
```

Figure 4

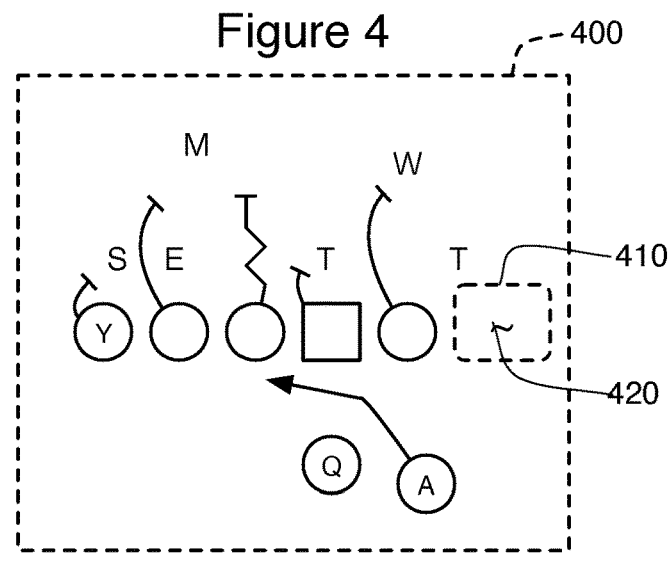

Figure 5

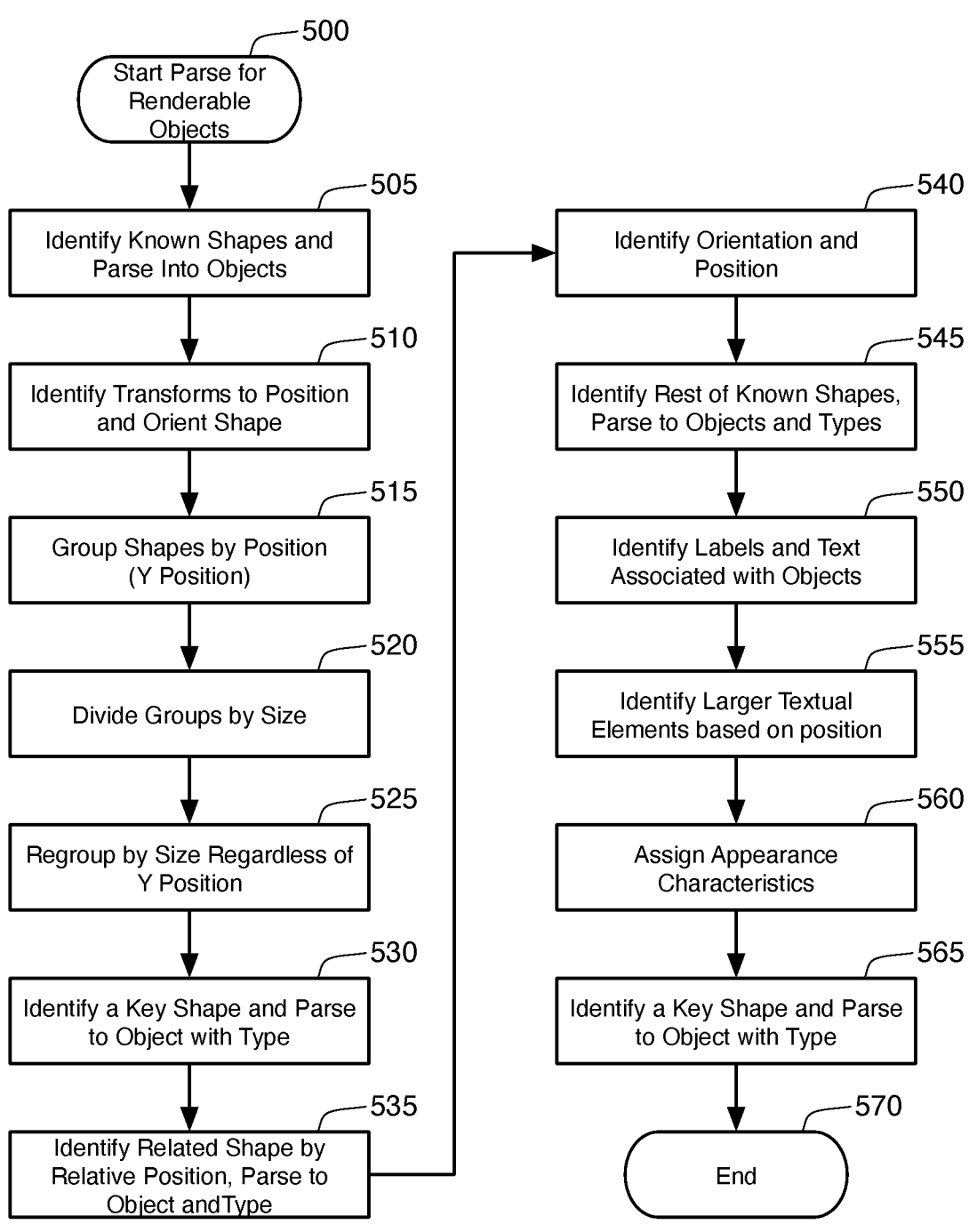

500 — Start Parse for Renderable Objects

505 — Identify Known Shapes and Parse Into Objects

510 — Identify Transforms to Position and Orient Shape

515 — Group Shapes by Position (Y Position)

520 — Divide Groups by Size

525 — Regroup by Size Regardless of Y Position

530 — Identify a Key Shape and Parse to Object with Type

535 — Identify Related Shape by Relative Position, Parse to Object and Type

540 — Identify Orientation and Position

545 — Identify Rest of Known Shapes, Parse to Objects and Types

550 — Identify Labels and Text Associated with Objects

555 — Identify Larger Textual Elements based on position

560 — Assign Appearance Characteristics

565 — Identify a Key Shape and Parse to Object with Type

570 — End

Figure 6
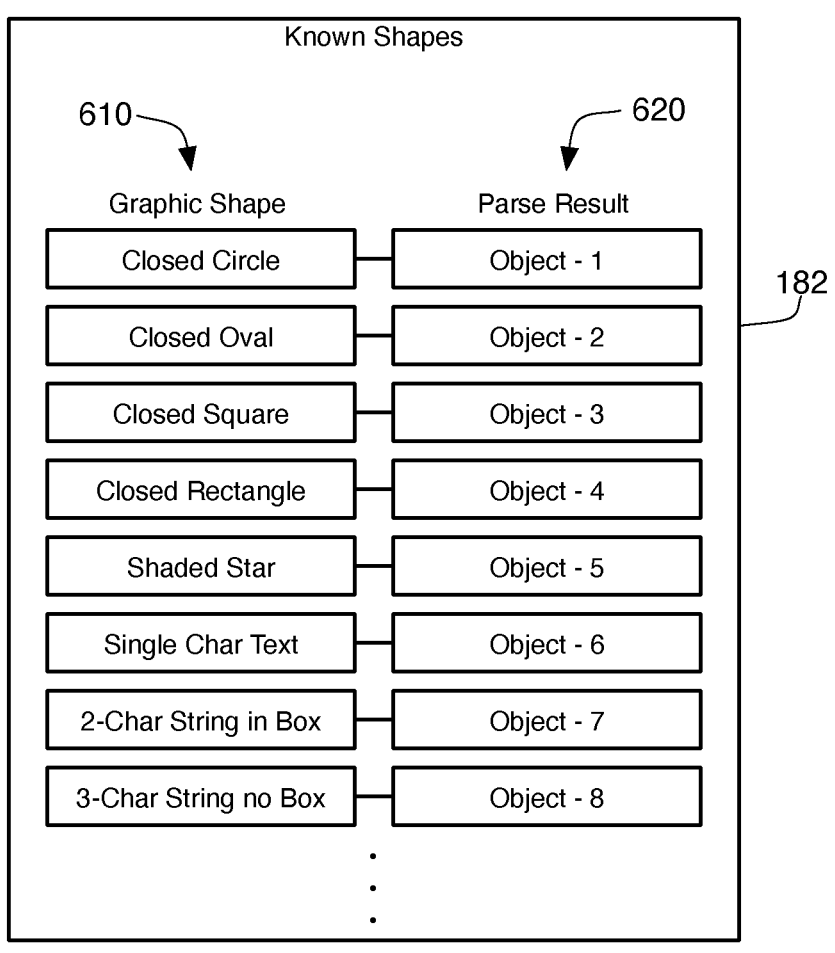
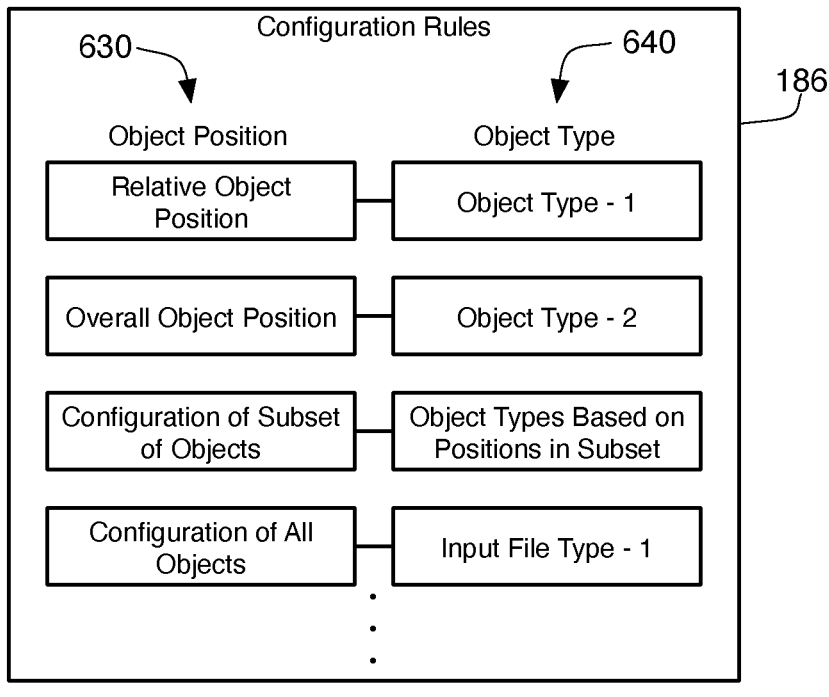

Figure 11

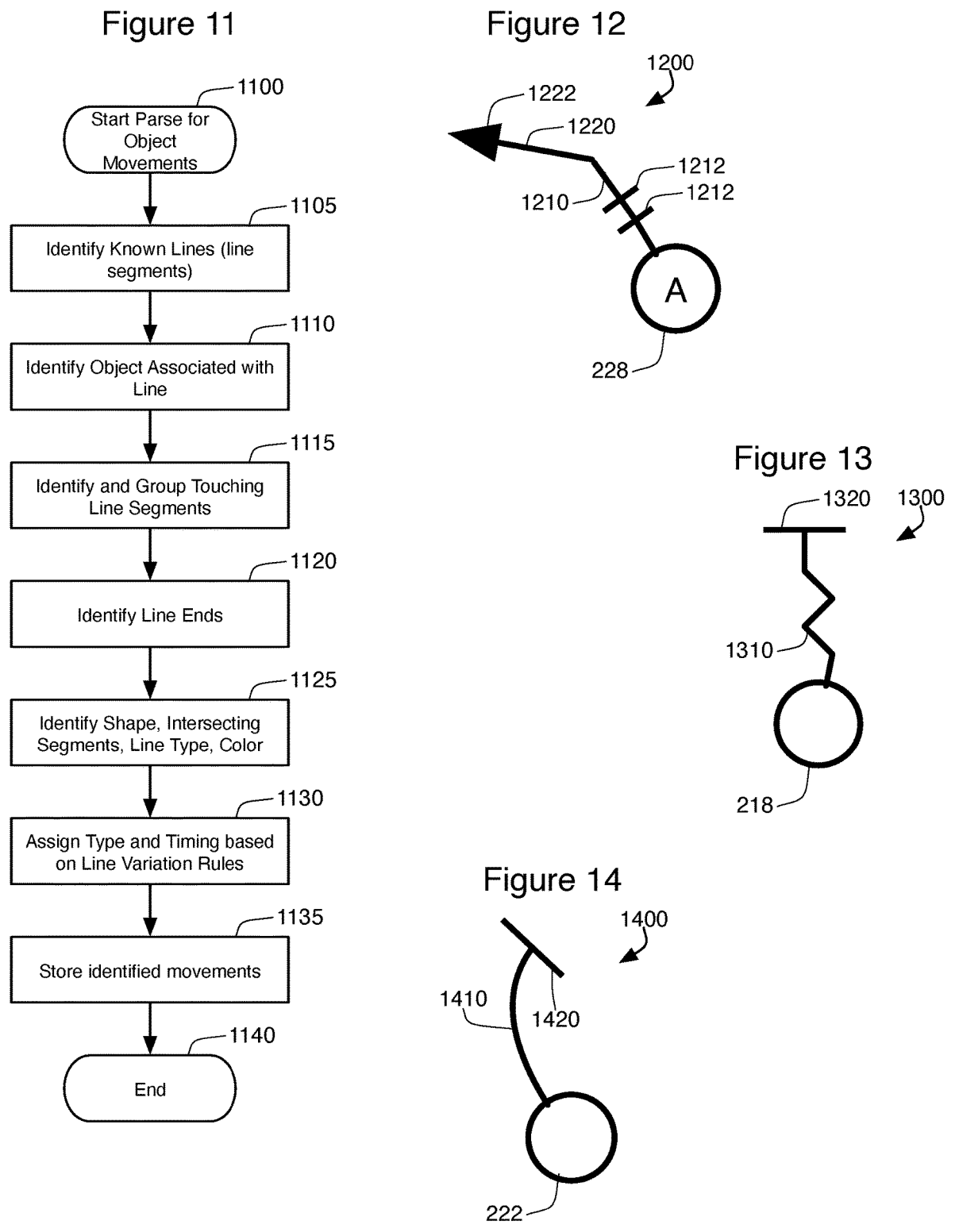

```
            ┌─ 1100
    ╭───────────────╮
    │  Start Parse for │
    │     Object       │
    │   Movements      │
    ╰───────────────╯
            │
            ▼        ┌─ 1105
    ┌─────────────────┐
    │ Identify Known Lines (line │
    │      segments)   │
    └─────────────────┘
            │
            ▼        ┌─ 1110
    ┌─────────────────┐
    │ Identify Object Associated with │
    │        Line      │
    └─────────────────┘
            │
            ▼        ┌─ 1115
    ┌─────────────────┐
    │ Identify and Group Touching │
    │    Line Segments │
    └─────────────────┘
            │
            ▼        ┌─ 1120
    ┌─────────────────┐
    │  Identify Line Ends │
    └─────────────────┘
            │
            ▼        ┌─ 1125
    ┌─────────────────┐
    │ Identify Shape, Intersecting │
    │ Segments, Line Type, Color │
    └─────────────────┘
            │
            ▼        ┌─ 1130
    ┌─────────────────┐
    │ Assign Type and Timing based │
    │  on Line Variation Rules │
    └─────────────────┘
            │
            ▼        ┌─ 1135
    ┌─────────────────┐
    │ Store identified movements │
    └─────────────────┘
            │
            ▼        ┌─ 1140
    ╭───────────────╮
    │       End        │
    ╰───────────────╯
```

VECTOR GRAPHIC PARSING AND TRANSFORMATION ENGINE

RELATED APPLICATION

The present application claims the benefit of U.S. Provisional Patent Application No. 63/073,128, filed on Sep. 1, 2020.

FIELD OF THE INVENTION

The present application relates to the field of computer graphics. More particularly, the present application relates to a parsing and transformation engine that analyzes 2D graphical images and identifies 3D renderable objects and associated movement patterns for storage and submission to a 3D graphics engine.

SUMMARY OF THE INVENTION

One embodiment of the present invention scans an SVG (Scalable Vector Graphics). Renderable objects, each graphically represented in the SVG file by one or more shapes, lines, text, and/or shading, are identified by the parsing engine and saved into an object according to a predefined class definition. In one embodiment, the class definitions and the rule set applied to perform this parsing are altered as necessary to conform to the content of the SVG file. Movement for the identified renderable objects, which are also graphically represented in the SVG file, are identified, associated with a particular renderable object, and saved through the same class definition. The instantiated object, sometimes referred to as the card object or the card object structure, is then used to feed renderable objects and movement to a 3D graphic engine, such as by submitting this information in the appropriate format to the API of the 3D graphic engine.

In one example embodiment, the present invention is used to parse and transform vector graphics that represent "plays" in the context of a sport or game. The play may be an American football play, a basketball play, a chess move, a set piece play in soccer, a lacrosse play etc. The vector graphics may also be unrelated to a sport or a game, such as diagram of an automobile accident. In the context of a football play, the SVG file may include symbols, texts, and lines that identify the offense and defense players and their associated motions, routes, blocking assignments, etc. Once players are identified, close lines are associated with the players, and each line is walked until the end of line is found. Line ends (arrow, circle, block lines) are then associated with each line based on proximity to the end of each line.

Once the play has been successfully parsed, the play data is transferred into an object in a database, where all geometry data needed to reproduce the play is stored. This object can then be transformed into any type of file, for example a Byte Cubed JSON file for rendering in a 3D Gaming Engine, Microsoft WPF 3D, or even into two-dimensional Power-Point or Visio formats for the like-named software products provided by Microsoft (Redmond, WA).

The same parsing engine can be used to parse other types of SVG files. When used in other contexts, different object classes are developed. Rules are utilized to identify and group shapes based on position and size, and convert the shape groupings into element of the defined object class. For example, business diagrams are different than football plays, which are different than diagrams of rooms in a house, which in turn differ from automobile accident diagrams.

Each context will require different parsing rules to identify the object based on the known conventions for identifying elements and known "legal" arrangement of icons in each type of input file.

BRIEF DESCRIPTION OF THE DRAWINGS

FIG. 1 is a schematic view of a system for parsing a vector graphics file.

FIG. 3 is a flow chart showing a method for a parsing and rendering a vector graphics file.

FIG. 4 is a first portion of a second embodiment of an input file.

FIG. 5 is a flow chart showing a method for parsing renderable objects.

FIG. 6 is a schematic view configuration rules for object parsing.

FIG. 11 is a flow chart showing a method for parsing object movement.

FIG. 12 is a schematic view of a first object and an associated movement line.

FIG. 13 is a schematic view of a second object and an associated movement line.

FIG. 14 is a schematic view of a third object and an associated movement line.

DETAILED DESCRIPTION

System

Figure 1:
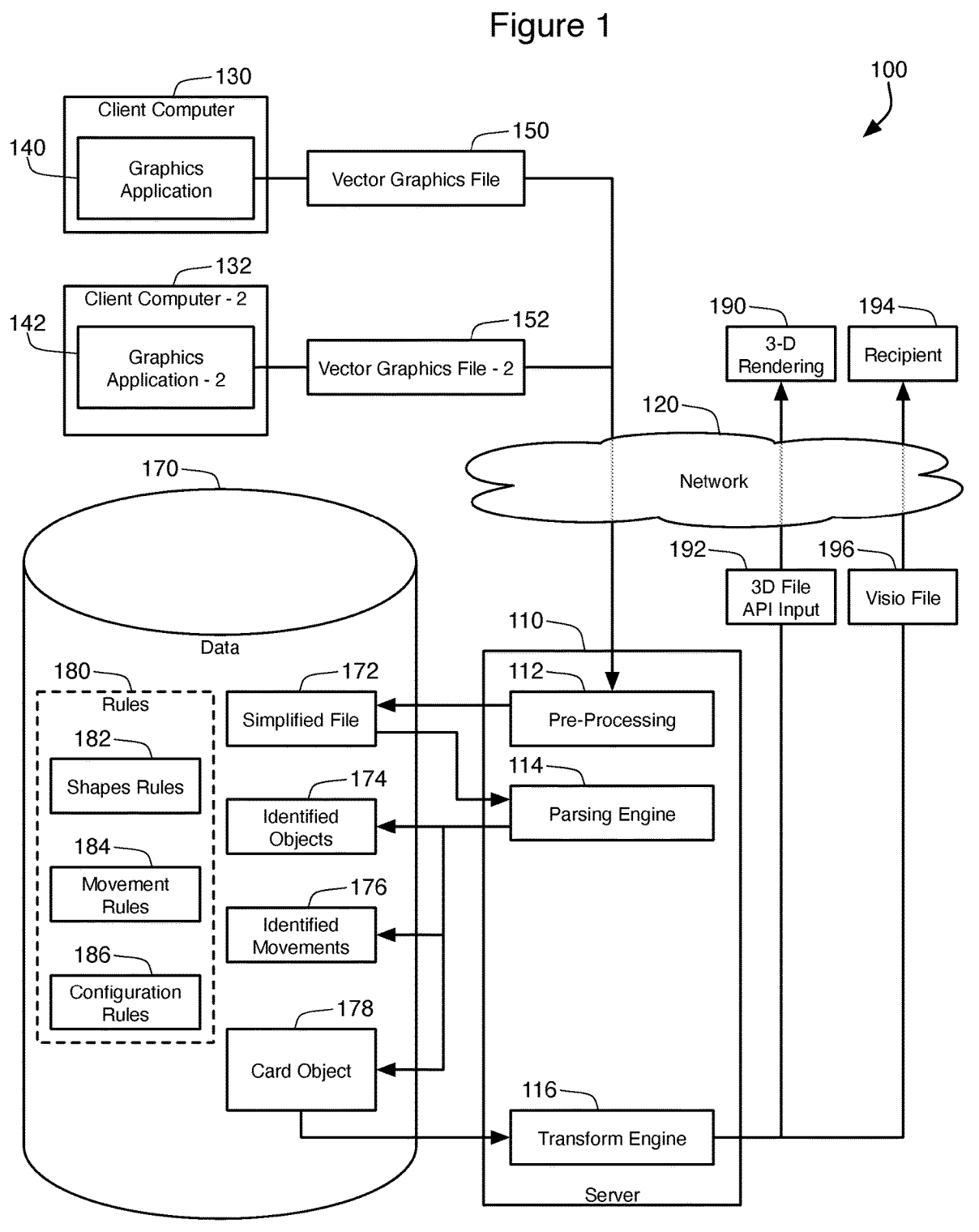
Figure 2:
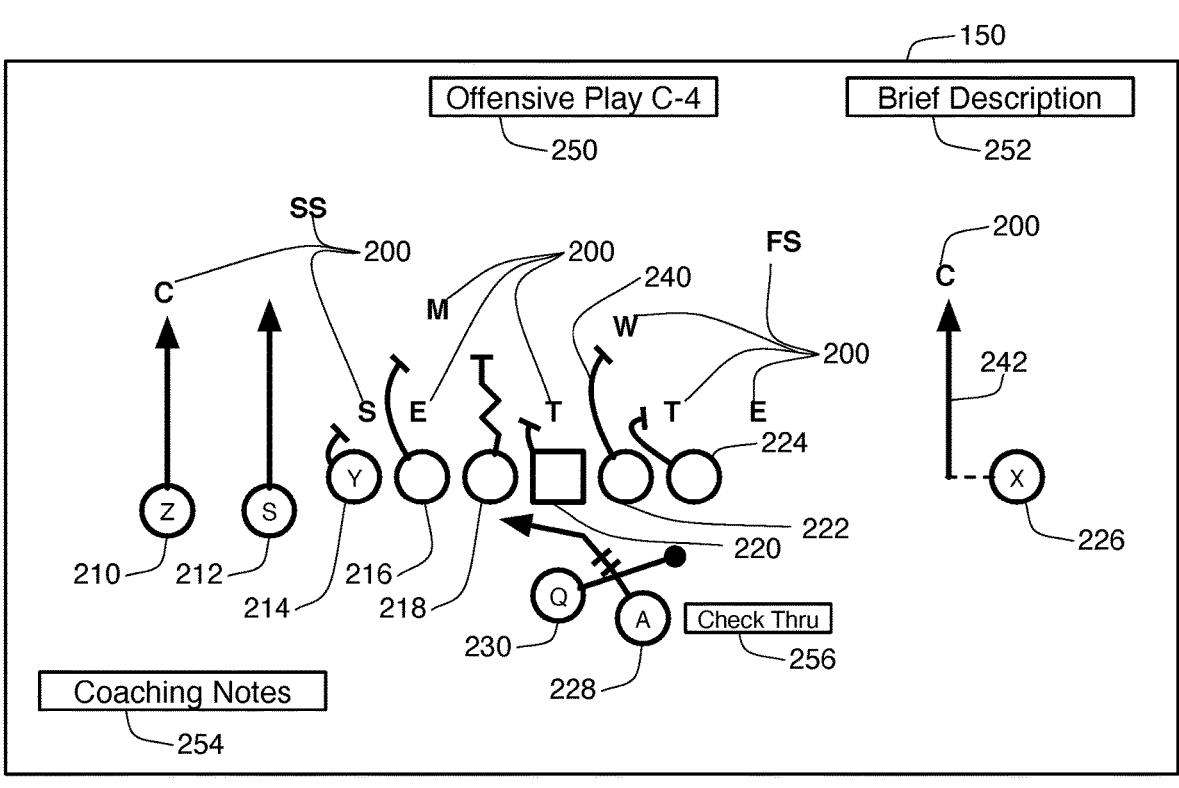
FIG. 2 is a schematic view of an input file.

FIG. 1 a system 100 that can be utilized to implement the present invention. The system 100 utilizes a server 110, which may take the form of one or more computer systems acting together to provide services to other devices over a network 120. In this case, the server 110 receives data from a client computer 130. The client computer operates a graphics application 140 to create a file 150 that is transmitted over the network 120 to the server 110. This file 150 is a graphics file, and more particularly is a two-dimensional (2D) vector graphics file. The server 110 may receive files from multiple client computers, with client computer-2 132 operating a different graphics application 142 to create vector graphics file-2 152.

In one embodiment, the graphics file 150 received from the client computer 130 is an SVG file. SVG stands for "Scalable Vector Graphics," and is an Extensible Markup Language (XML)-based vector image format for two-dimensional graphics. Some programs, such as Microsoft's Visio and PowerPoint applications, can save their work product directly as an SVG file. This is usually accomplished by exporting the document from a native format to an SVG file. Other programs can also create SVG files, such as Pro Football Focus (or "PFF," from Play Football Focus, Cincinnati, OH), which creates football play diagrams. The two graphics applications 140, 142 shown in FIG. 1 generally create files with incompatible formats, but both create SVG files for receipt by the server 110. For the purposes of describing the present invention, the input graphics file 150 will be considered the file received by the server 110. Furthermore, this file 150 will be considered an SVG file, although the invention will work equally effectively with other file formats.

Once the incoming file 150 for processing is received, the file is pre-processed using the pre-processing engine 112. This engine 112 will convert the received file 150 into a simplified file format 172 that is stored in data storage 170 that associated with the server 110. In one embodiment, the pre-processing engine 112 utilizes Ab2d.ReaderSvg software provided by AB4D (Ljubljana, Slovenia). The Ab2d.ReaderSvg software converts the input SVG file into a WPF ("Windows Presentation Foundation") file format file. WPF is a free and open-source graphical subsystem developed by Microsoft for user interfaces in the Windows operating system. The SVG file format is a very flexible and complex file format, but programs that export to SVG can create very different SVG output for the same drawing. To remove this complexity and variability, the Ab2d.ReaderSvg software is used to convert disparate SVG files and convert them to the simpler WPF format. The WPF format can utilize XAML (Extensible Application Markup Language), which is a declarative XML-based language developed by Microsoft that is used for initializing structured values and objects The parsing engine 114 takes this simplified file 172, parses the file for renderable objects 174 and associated movements 176, temporarily stores this data 174, 176 in the server's data 170, populates a card class object 178 and stores this in data 170. The parsing engine 114 utilizes rules 180 that can also be stored in the data 170 to perform its parsing. This rules 180 include information about known shapes 182 and movement/line rules 184 that can be identified in the simplified file 172 in order to populate the card object 178. The rules 180 also contain configuration rules 186 that define the possible overall configuration of the input file 150 in order to aid in the identification and extraction of data from that file. These configuration rules 186 may define the configurations that are allowed to exist based on the type of the input file.

The populated object 178 is then transformed into another format using the transform engine 116. The transform engine can interact with a motion-providing 3D rendering engine 190 using API input 192, such as the engine 190 and API 192 provided by ByteCubed. Alternatively, the transform engine 116 can create another 2D file such as a Visio file 196 (from Microsoft) that is transmitted to a recipient device 194. Note that the recipient device 194 may be the same computing system that operated as the client computer 130 that transmitted the vector graphics file 150. The techniques used by the parsing engine 114 and transform engine 116 are described below.

The server 110, the client computers 130, 132, the 3-D rendering engine 190, and the recipient device 194 shown in FIG. 1 are all computing devices. That means that each device 110, 130, 132, 190, 194 includes a processor for processing computer programming instructions. In most cases, the processor is a CPU, such as the CPU devices created by Intel Corporation (Santa Clara, CA), Advanced Micro Devices, Inc (Santa Clara, CA), or a RISC processer produced according to the designs of Arm Holdings PLC (Cambridge, England). Furthermore, these computing devices 110, 130, 132, 190, 194 have memory, which generally takes the form of both temporary, random access memory (RAM) and more permanent storage such a magnetic disk storage, FLASH memory, or another non-transitory (also referred to as permanent) storage medium. The memory and storage (referred to collectively as "memory") contain both programming instructions and data. In practice, both programming and data will be stored permanently on non-transitory storage devices and transferred into RAM when needed for processing or analysis.

The data 172, 174, 176, 178, 180 shown in FIG. 2 can be separated into physical files, such as files 172; pure data, such as the objects 174, movements 176, and the populated data object 178; and data rules 180. The files 172 can be stored in data 170 in a file system, as is known in the prior art. The pure data 174, 176, 178 is stored in some type of structured data store, which may take the form of a standard database. The rules 180 (including known shapes 182 and movement rules 184), can also be stored in a data store, but may include both raw data and programming designed to associated identified shapes and line variations with objects 174 and movement 176.

This data 170 may physically be located within or as part of the server 110 or may be located remotely from the server 110 over a local area network, a storage area network, or even a remote wide area network. If located remotely, the data 170 may be controlled by a separate data controller computer (not shown). The data 170 generally stores data in one or more defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data 170 can be "associated" with other data. This association can be implemented using a variety of techniques depending on the technology used to store and manage the database, such as through formal relationships in a relational database or through established relationships between objects in an object-oriented database.

The engines 112, 114, 116 constitute computer programming operating on the CPU device(s) of the server 110. These different engines 112, 114, 116 can be executed as separate programs, or as separate routines, or they can be implemented as separate functions of a single, integrated computer program.

Overall Method and Play Diagram

FIG. 2 shows the content of an input graphics file 150 as received by the server 110. The pre-processing engine 112 receives this file 150 and simplifies the instructions within the file 150 that define the various objects, lines, and data elements shown in FIG. 2 in order to create the simplified file 172. While the instructions that define the objects, lines, and data elements are simplified, a visual representation of the simplified file 172 should appear identical to the input file 150. Thus, while FIG. 2 shows the input file 150, the same representation would be accurate for the simplified file 172. The following description of the parsing engine 114 will therefore discuss parsing the visual content of the input file 150 even though, in at least one embodiment, the parsing engine 114 operates on the simplified file 172 and not directly on the input file 150.

The content of the input file 150 is shown in FIG. 2. This content represents an American football play diagram. The file 150 shows eleven defensive players 200 represented by single character strings in the diagram. The file 150 also shows eleven offensive players 210-230, which are represented by closed shapes, namely ten closed circles 210-218, 222-230 and one closed square 222. These closed shapes 210-230 sometimes include text characters within their boundaries, such as the "Z" within circle 210 and the "Q" in circle 230.

In this input file 150, each of the offensive players 210-230 are associated with a movement line, such as line 240 associated with offensive player 222 and line 242 associated with offensive player 226. These lines 240, 242 have a base that is connected to (or otherwise located proximal to) the closed shape representing the players 222, 226, and they have various shapes, directions, and termination elements. The termination elements can be an arrowhead, in the case of line 242, or a blocking line used in football play diagram, in the case of line 240. Other types of termination elements are possible.

The input file 150 also includes textual elements, such as a title 250, a description 252, coaching notes 254, and a textual element description 256. Some of these textual elements, namely elements 250-254, are located at preset locations in the input file 150, such as at the top middle location, the top right location, and the lower left location, respectively, of the file 150. Other textual elements are associated with one of the offensive players. In some embodiments, it may be possible to identify a text object, such as the "Check Thru" object 256 as being located proximal to particular offensive player 228 and therefore be associated with that player object 228. In other embodiments, the text object 256 would be rendered as part of the background or setting for the other objects. In still further embodiments, this text object 256 would not be rendered as part of the setting but would instead be saved as text data associated with the entire file 150.

This input file 150 shows a football play. Even if all input files 150 received by the server 110 represent football plays, the variations possible within this this type of file are numerous. The offensive players 210-230, for example, can be in a different formation, can run different patterns and have different blocking assignments, can include different player types, can be oriented differently, can utilize different shapes, can be shaded or color-coded, etc. Furthermore, the server 110 is not limited to operating only on these types of files 150, as other types are possible, such as those described below in connection with FIGS. 9 and 10.

The closed shapes 210-230, the characters 200, as well as the lines 240, 242, and the textual elements 250-254 can all be considered graphic elements that are found in the input file 150. The parsing engine 114 applies rules or hard-coded programming to parse the graphic elements found in this file 150 (or, as explained above, the simplified file 172). The ultimate goal of this parsing process is to populate a data structure 178 that defines elements or objects for the various items that are shown in the image file 150 being processed. This data structure 178 is described in more detail in connection with FIGS. 17 and 18 below. In the context of a football play, such as that shown in FIG. 2, the goal is to populate the PlayCard class structure 1700 shown in FIG. 17, which is a simplified representation of the class definition for defining the elements of a football play.

The parsing engine 114 is programmed with an understanding of legal offense formations, which allows the engine 114 to group shapes identified by similar Y position and similar size to identify offense players consistently. In some embodiments, the consistent use of symbols in the input file 150 can be identified and used as part of the parsing process. For example, the center position may be drawn as a rectangle or square, with offensive players drawn as ellipses or circles. Defense players may be indicated using text blocks with 3 or fewer characters.

The overall process 300 performed by the server 110 on the incoming file 150 is shown in the flow chart of FIG. 3. The first step 305 is the identification of the input vector graphics file 150. This identification step 305 can be as simple as receiving the file 150 from the client computer 130 over the network 120 with a request to process the file 150. In some embodiments, it is possible to operate the engines 112, 114, 116 of the server 110 locally at the client computer 130. In these embodiments, the processing of the engines 112, 114, 116 would function similarly, and the identification step 305 might constitute opening the file 150 in an application that contains the programming for these engines 112, 114, 116.

The next step 310 is to use the pre-processing engine 112 to convert the incoming vector graphics file 150 into a simplified file 172. In one embodiment, the input file 150 is in SVG format, the pre-processing engine 112 is the Ab2d.ReaderSvg software described above, and the simplified file 172 is in the WPF file format. Other pre-processing software could be used. Alternatively, the input file 150 provided by the client computer 130 could be created in a simplified file format (such as WPF), meaning that the pre-processing step 310 would not be required. In other embodiments, the parsing engine 114 would operate directly on the non-simplified file 150. In this way, step 310 can be skipped depending on the structure of the received file 150 and the programming of the parsing engine 114.

After this, the parsing engine 114 will parse the simplified file 172 to identify objects 174 found in the file 150 according to the rules 180. This occurs in subprocess 500, which is described in connection with the flowchart of FIG. 5 in more detail below. This subprocess 500 will utilize the rules 180 to not only identify separate objects 174, but to uniquely identify different types of objects 174 and the expected overall location of the objects 174 with respect to one another in the input file 150. In some cases, however, the subprocess 500 will identify a location where an object 174 is expected to be found, but the rules 180 do not accurately allow the specific identification of any object 174 at that location. If the server 110 during subprocess 500 fails to identify an object at this known location, the server 110 will instead, at step 315, will create a placeholder object at that location. FIG. 4 shows a subsection 400 of a play diagram in which the position of an expected but not found object 174 is identified by step 315, and a placeholder 410 has been positioned. This placeholder 410 is represented by the dashed box 410 shown in FIG. 4, which in this case was drawn around an extraneous symbol or graphical item 420. The extraneous item 420 in this case is a tilde ('~') character. The placeholder box 410 identifies the location where the missing item should be found. Although the placeholder box 410 is shown as a graphics box drawn within the subsection 400, there is no need for the parsing engine 114 to actual draw such a box—it is only necessary for the parsing engine 114 to identify and (temporarily) remember the location of this box. After step 315 identifies this location 410, it then examines the content of the input file 150 (or the simplified file 172) at that location to see if another symbol or unexpected graphics shape is found at that location. If one is found, such as the tilde character 420, then that object 420 is identified as the missing object even though the rules 180 failed to provide instructions that this character (the tilde 420) was to be considered an object 174.

Next, the parsing engine 114 will parse the input file 150 (again, this may be accomplished by parsing the simplified file 172) to identify object movements 176 through process 1100. This process 1100 is described in detail below in connection with FIG. 11.

After the objects 174 and object movements 176 have been identified by the parsing engine 114, the server 110 will examine these objects 174 and movements 176 to identify an overall type for the input file 150. In the context of a football play, the positions of the identified objects 174 can determine a formation for the play, and the movements 176 of these objects 174 can determine a play type. In at least one embodiment, the configuration rules 186 provide details to be able to identify a formation and play type based on this information at step 320.

At step 325, the server will identify text elements that are not associate with objects. As explained below, letters within shapes are associated with individual objects, but other text elements, such as elements 250, 252, 254, are identified at step 325 and ate associated with the overall file 150.

Figure 16:
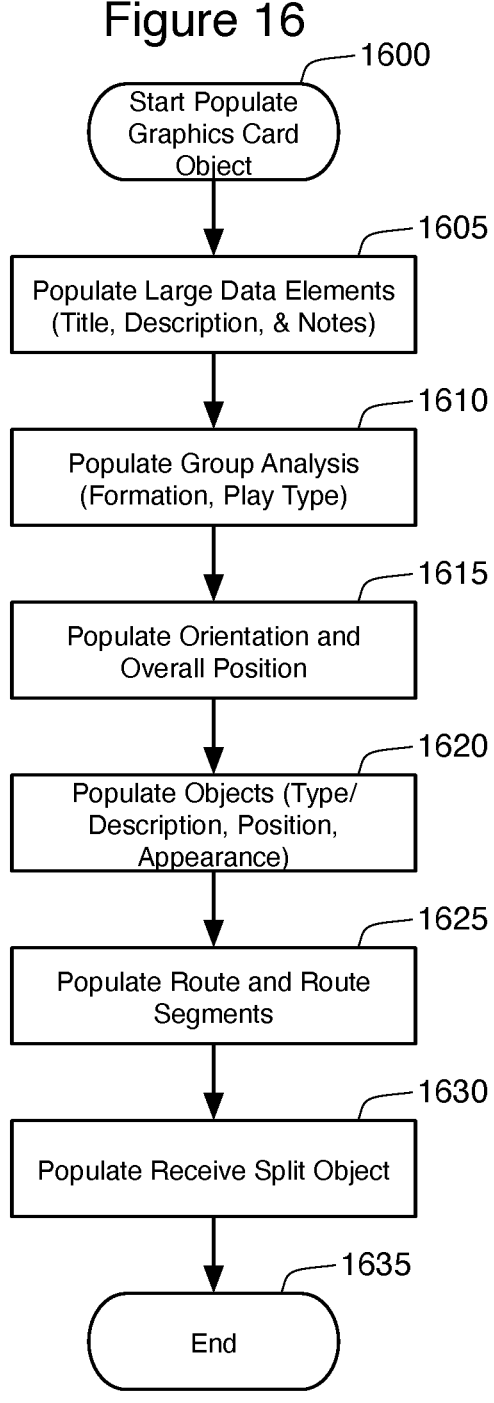
FIG. 16 is a flow chart showing a method for populating a card data entity.

At step 1600, the card object 178 is populated, which is again shown in detail in a separate flow chart as seen in FIG. 16. Then, at step 1900, the data in object 178 is used by the transform engine 116 to provide input 192 to a 3-D rendering engine 190, as set forth in FIG. 19. The engine 190 then renders the input 192 and generates the movement of the defined objects. The process 300 then ends at step 330.

Object Parsing Method 500

The parsing engine 112 is responsible for taking the simplified file 172 (or the input file 150, depending on the embodiment) and identifying objects 174 and the movement 176 of objects 174, and populating the card object 178. These separate functions are described in the object parsing method 500 of FIG. 5, the movement parsing method 1100 of FIG. 11, and the card object population method 1600 of FIG. 16.

The object parsing method 500 starts at step 505 with the system 100 using the known shapes rule 182 information found in the rules 180 to identifying separate elements in the input file 150 that match known shapes. The known shapes rules 182 associate a particular graphic shape 610 with a particular object or element 620, as is schematically shown in FIG. 6. In effect, applying the rules 182 classifies the shapes 610 into a particular category or object type 620. The closed circle shape is parsed into the object-1 result, the closed oval shape is parsed into the object-2 result, the closed square shape into object-3, and so on. In the context of a football play, the graphic shapes 610 are generally geometric shapes (circles, ovals, squares, rectangles) or one-to-three-character (chars) text strings. The object types associated with these shapes might be "offensive player" and "defensive player," or may be more specific (such as "quarterback," "center," or "tackle"). These graphic shapes will differ in other embodiments when the parsing engine in used in other contexts.

Figure 15:
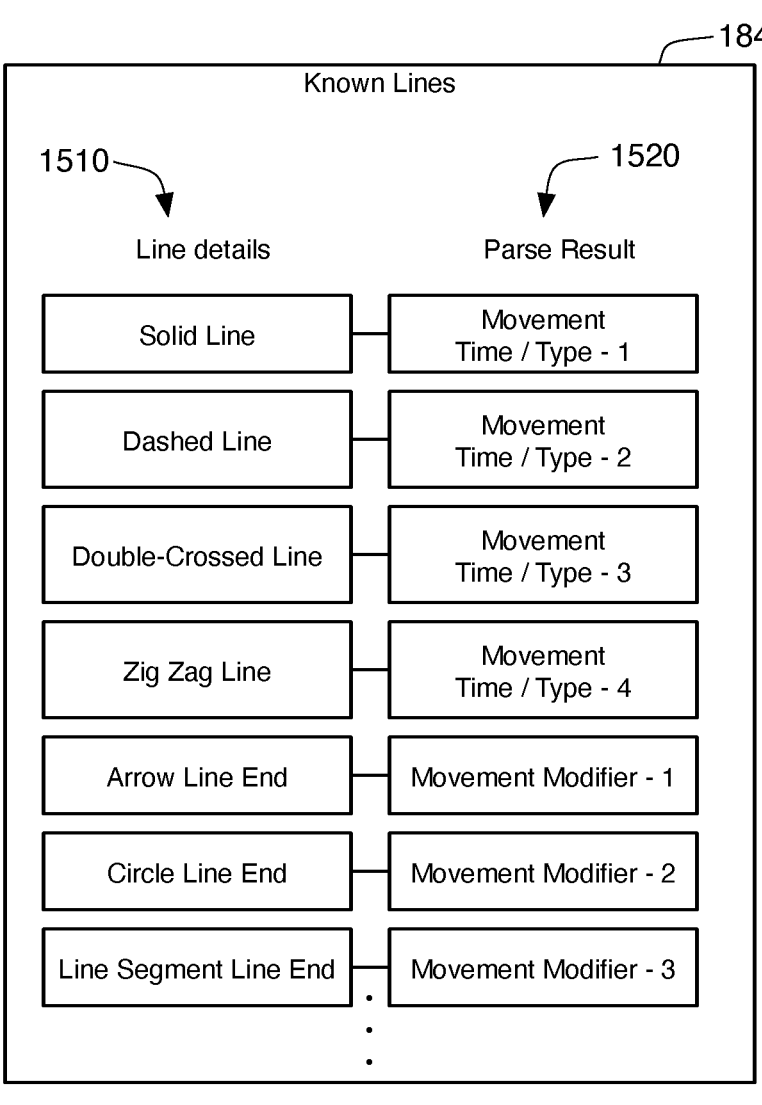
FIG. 15 is a schematic view of rules for movement parsing.

FIG. 6 also shows some details associated with configuration rules 186 (movement/line rules 184 are shown in FIG. 15). Configuration rules 186 describe knowledge that can be learned based on the position of an identified object 174 in the input file 150, or the position of one object 174 with respect to another known object 174. Configuration rules 186 can be used, for example, to identify a type characteristic for an identified object 174 based on its fixed position in the overall file 150 or its relative position relative to another object 174. Configuration rules 186 can also analyze all or a subset of the identified objects 174 to determine some characteristic of the entire input file 150. Thus, configuration rules 186 have inputs 630 related to the position of one or more objects 174 and outputs 640 that help characterize an object 174, a group of objects 174, or even the entire input file 150.

When the input file 150 is in the WPF file format, or where a simplified file 172 using the WPF file format is being parsed, the graphic shapes 610 will be defined as known shapes within the file 150 itself. In particular, WPF uses a "shape" object that include the following shapes: ellipse, rectangle, line, path, polygon, and polyline. The shapes can be defined with stroke, strokeThickness, and fill properties. Circles are ellipses with equal height and width values, and squares are rectangles with equal height and width.

At step 510, the server 110 determines the transformations (scale, rotate, translate) necessary to ensure the position and size are correct for each object in the drawing. In other words, this step identifies the locations of each of the objects in the drawing (through the determination of translations), the orientation of each of the objects (through the determination of rotations, if any), and the size differences between the objects (through the determination of scale transformations, if any). Transforms are used by a variety of graphics drawing tools (SVG and WPF included) to place and size a shape on a page (or some other defined space). By utilizing transforms, an object that is copied, flipped, rotated, resized, and moved when created may be stored in the resulting graphics file as the originally copied object along with transformations that flip, rotate, resize, and move the object. Note that these transformations may not have been found in the input file being parsed 150, which may have specified positions through absolute coordinates and sizes as opposed to transformations.

Figures 7, 8:
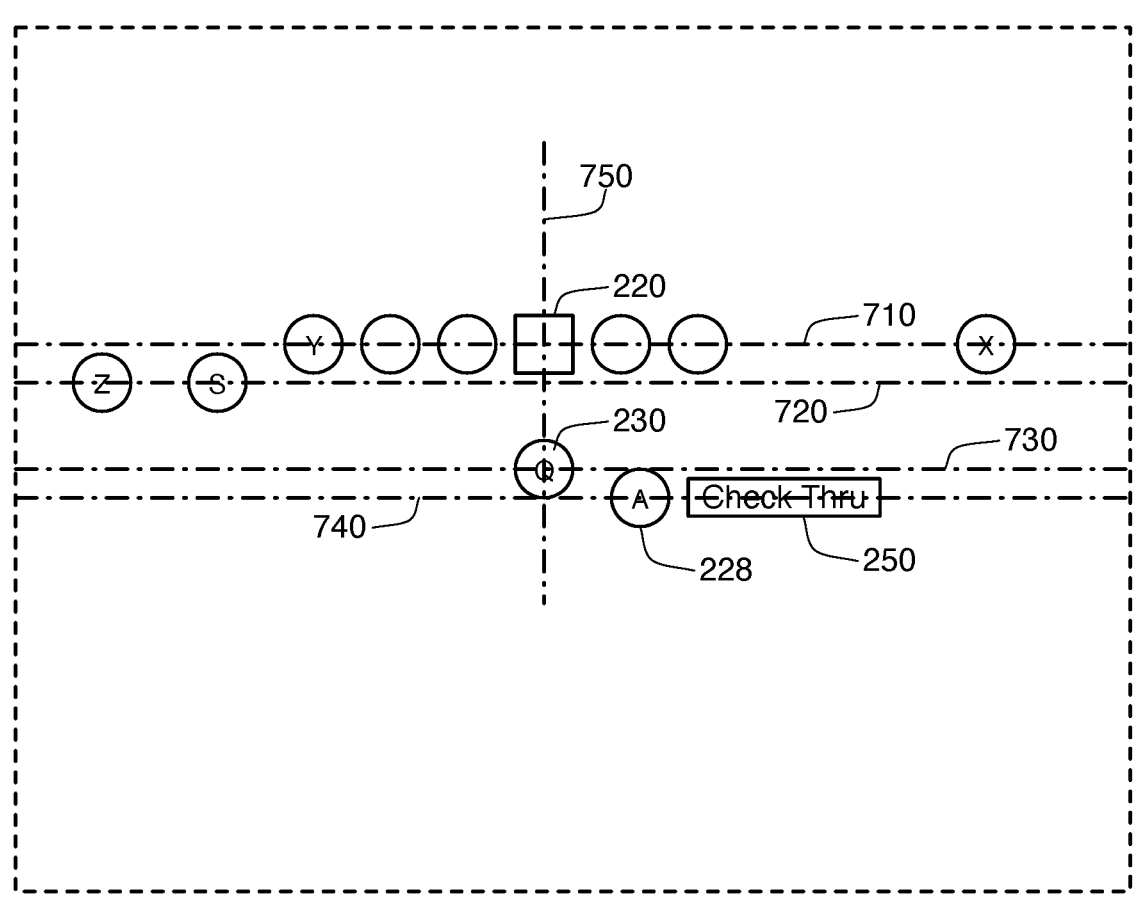
FIG. 7 is a partial view of the input file of FIG. 2 with axial lines.
FIG. 8 is a partial view of the portion shown in FIG. 7.

Step 515 is one of the steps responsible for grouping closed objects together. In Step 515, identified objects 174 are grouped by their Y Position, as shown in FIG. 7. FIG. 7 shows only a portion of those elements found in FIG. 2 in order to simplify this discussion. Dotted/dashed lines 710, 720, 730, 740 show lines that are used to group the offensive player objects 174 based on their position on the Y axis. As shown in this Figure, six objects 174 are on line 710, two objects 174 are on line 720, one object on line 730, and two objects 228, 250 are found on line 740. Step 515 groups these objects accordingly.

At step 520, these grouped objects 174 from step 515 are further sub-divided into separate groups based on their size. As shown in FIG. 7, the objects 174 on line 710 are all the same size, as are the objects on lines 720 and 730. However, as shown in more detail in FIG. 8, object 228 is taller than object 250 even though both are centered on line 730. Thus, the text box 250 and the circle 228 are both subdivided into separate groups even though they share the same Y-axis position 730. This results in five groups, namely the groups organized by line 710, line 720, line 730, and the groups defined for circle 228 and textbox 250. Note that grouping steps 515 and 520 are applied to all of the elements in input file 150, including the defensive players 200, even though FIG. 7 shows only the offensive players 210-230.

The groupings of steps 515 and 520 are to help identify the overall configuration of the objects 174 as identified by the configuration rules 186. In the context of a football play, for example, step 510 identifies objects 174 positioned on the same position of the Y axis, and then step 515 can be used to identify and exclude objects of a different size on those Y axis locations. In FIG. 7, the offensive player objects are grouped with seven objects 174 on the highest location on the Y axis, and then two at the next lower location, and then one and one (with box 250 being excluded because of its different size). FIG. 7 shows a subset of FIG. 2, where FIG. 2 shows that the defensive players are aligned with six objects at the lowest Y axis location, then one, then one, then two, and then one. With this identification, we can identify a "line of scrimmage" for this play being the horizontal line at the Y axis location halfway between the Y axis location of the group of seven offensive players and the Y axis location of the five defensive players. Once the line of scrimmage is obtained for a football play, more details about the individual objects 174 can be extracted from the configuration rules 186.

At step 525 another grouping step takes place. In this step, the identified objects 174 are grouped by size regardless of their location on the Y axis. Referring to FIG. 2, this results in all defensive players 200 being placed into a group, the offensive players identified by circles and squares (elements 210-230) are in a second group, the small text box 256 is a third group, and the larger text boxes 250, 252, 254 are placed into a fourth group. The line of scrimmage (or any other information about the overall configuration) identified through steps 515 and 520 can be used to separate these groups in step 525.

At step 530, the known overall configuration rules 186 are used to help interpret the identified objects and groups. For example, in the context of a football play, one of these configuration rules 186 will indicate that the largest group of closed shapes identified in step 525 that includes a rectangle (shown as a square) shape is to be identified as the offensive players 210-230. This rule 186 stems from the understanding that in football play diagrams, offensive players 210-230 will generally all have the same size, and the center position is always drawn as a rectangle. In this case, the rectangle/square element 220 is a "key shape," as that shape will inform not only about that particular object 220 but will also provide information about related objects (those objects of the same size). This rule 186 also allows the rectangle Center 220 to be distinguished from other rectangles 250, 252, 254, as the rule requires that the largest group of closed shapes must include the center rectangle 220, and the set containing rectangles 250, 252, 254 is not as large as the set containing the eleven offensive players 210-230.

At step 535, a second object 174 is specifically identified based on its location in the input file 150 relative to the key shape identified in step 530. The rules that help identify this second shape are again the overall configuration rules 186. In the context of a football play, step 535 will identify the closest shape in the group from step 525 that aligns with the X position 750 of the identified center rectangle 220. This is circle 230, and the rules 186 will identify this object 230 as the quarterback. As can been seen in FIG. 7, the circle closest to the center rectangle 220 and vertically aligned (line 750) along the center of the rectangle 220 is the quarterback circle 230. Step 535 makes this determination, and then ensures that this information is stored as part of the object data 174 found in the data store 170.

Now that the center 220 and quarterback 230 have been identified, their positions relative to each other can be used to determine if the offense has been drawn on the bottom or the top of the page. In other words, the orientation of the input file 150 can be determined, which occurs at step 540. If the quarterback 230 is below the center 220, as shown in FIG. 7, then the offense is on the bottom. If the quarterback 230 is above the center 220, then the offense is on the top.

The relationship between the relative positions of these shapes 220, 230 to the overall orientation of the input file 150 is found in another of the configuration rules 186. Some drawing types would use other rules 186 to determine orientation in step 540, while still other drawing types would not need to even determine an orientation.

Next, step 545 determines all other information that can be generated about the identified objects 174 based on the information stored in configuration rules 186. In the context of a football play, the server 110 can look to the right and left of the center 220 to identify the guards 218, 222. The server 110 then looks to the right and left of the guards 218, 228 to identify the tackles 216, 224. As explained above, if an object 174 is not found in these positions, a placeholder 410 can be inserted.

The rules 186 will also inform the server 110 how to characterize shapes in groups that do not contain the "key shape." In the context of football plays, the rules 186 inform the parsing engine 114 to identify all short textual elements on the defense side of the line of scrimmage as defensive players. Short textual elements are generally of 3 characters or less (or as defined in user preferences). The defensive side is, of course, opposite the offensive side that is found using the process explained above. The rules 186 will also be able to identify the line of scrimmage as the avg difference between identified center 220 and the closest defense player.

At step 550, the server 110 will identify text elements that have their center close to the center of any of the identified offense players 210-230. In FIG. 2, the letter Z is close to the center of circle 210, S is near the center of 212, Y to circle 214, X to circle 226, A to circle 228, and Q to circle 230. These letters/text shapes are then added to the information stored about the identified objects 174. In other words, object 210 will now be associated with the letter Z in the data store 170.

At step 555, longer textual items such as items 250, 252, 254, and 256 are analyzed. 250, 252, and 254 can be identified as particular types of textual content based on the information about the incoming file 150 found in the configuration rules 186. For example, these rules 186 can specify that centered text near the "top" of the content in the file 150 is title 250, text 252 in the upper right is a description of the play, and text in the lower left 254 are notes. In other embodiments, the rules 186 only identify titles 250 and descriptions 252, and all other text that is not associated with an identified object 174 is considered coaches notes. In still other embodiments, all text that is not associated with an identified object 174 will be coaches notes.

Figure 10:
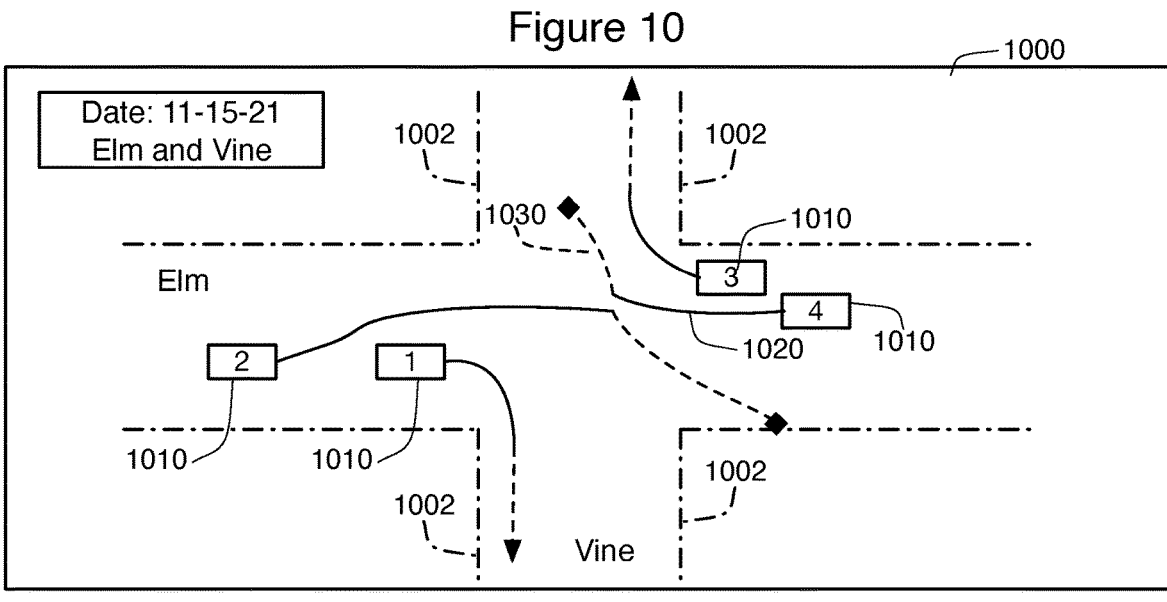
FIG. 10 is a schematic view of a fourth embodiment of an input file.

Step 560 is responsible for identifying appearance and other characteristics that are to be stored in connection with the identified object 174. For example, shading or color can be used on some of the graphic shapes found in the input file 150. Information about this shading or color can be stored in the data store 170 in association with that object. Step 565 detects background information in the drawing that is not related to a particular object 174 but instead defines the setting for the movement identified in the input file. In the example of a football play shown in FIG. 2, the input file 150 may show yard markers, numbers, hash marks, or one or both end zones, which together establish the setting for the movement. In the example of FIG. 10, the setting data constitutes the road edges that identify the intersection. The method 500 then ends at 570.

Alternative Input File Formats and Objects

Figure 9:
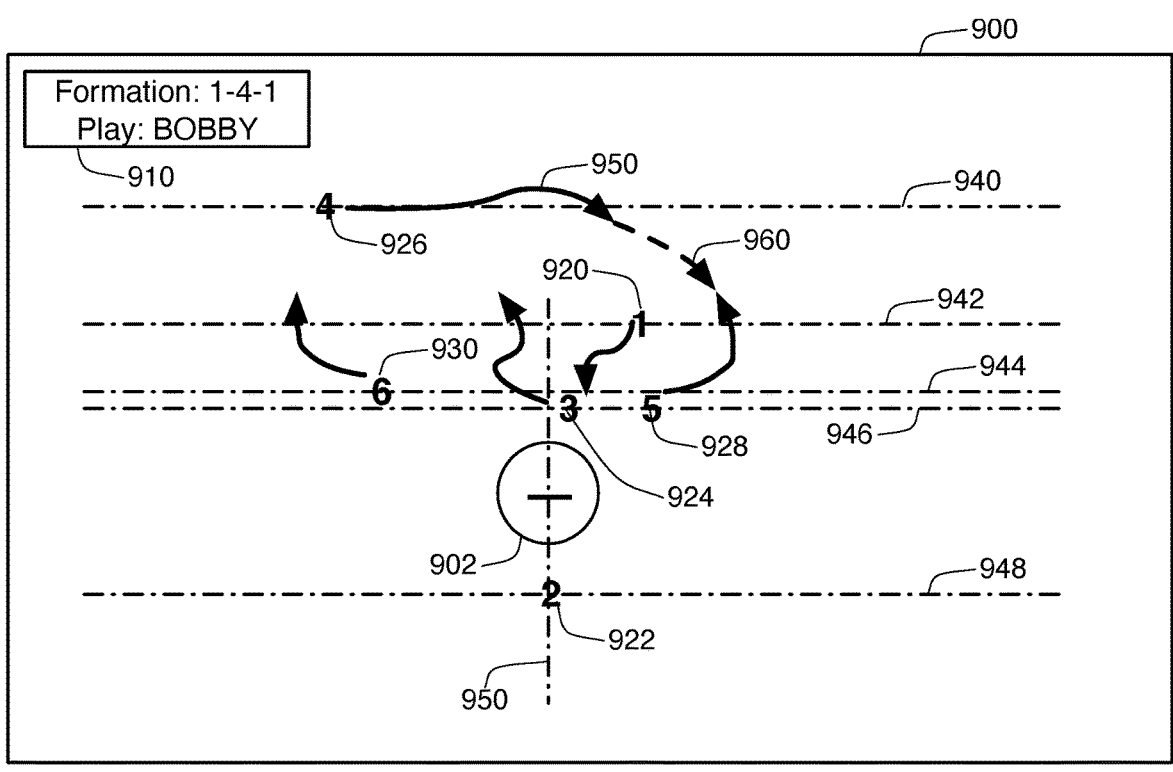
FIG. 9 is a schematic view of a third embodiment of an input file.

FIG. 9 shows an alternative input file 900 that contains a lacrosse play diagram. In this input file 900, text data 910 found in the upper left can be considered metadata for the entire file (containing, for instance, the formation and play name). Objects 920-930 are identified as single character text strings, which would be specified by the known shape rules 182 applicable for this type of data file 900. The rule 182 may further indicate that the single character text strings should consist only of a numeric digit. Background objects, such as circle 902, define field characteristics. Such objects 902 can be identified by the rules 182 and can be used to position this play diagram to a particular location on a lacrosse field. Movement lines are also found in this file 900, with all of these lines ending in arrow heads. FIG. 9 shows that some of these lines, such as line 960, can link to the end of another line 950, and that one of these lines 960 can be dashed while another line 950 is solid. The interpretation of these different lines can be governed by the line/movement rules 184 for this file 900, as is described in more detail below. This file 900 can also use horizontal alignment lines 940, 942, 944, 946, and 948 to group objects as well as one or more vertical alignment lines 950. As is the case with the football play in file 150, these groupings can help the parsing engine 114 identify particular objects 174 from the file 900, such as the game positions represented by each object 920-930.

FIG. 10 shows a second alternative input file 1000. In this case, the file 1000 diagrams a street intersection showing the movement of four automobiles 1010 in order to represent a traffic accident. Although this graphical input file 1000 does not relate to a sports play, the same processes can be used by the parsing engine 114 to parse this input file 1000. All that is necessary is for the rules 180 to be modified to relate to this context. The automobiles 1010 may be considered all of one object type, or distinctions might be made between different automobiles depending on their role in the diagramed accident. In similar drawings, automobiles 1010 may be shown in file 1000 as different from trucks or bicycles, and the rules 180 may distinguish these items as different object types. The background street markings 1002 can be identified, for instance, by the type of dotted-dashed line used to represent the street in this file 1000, and this can be set forth in the rules 180. These streets 1002 identify the location of the vehicle objects 1010 in the same way as field mark 902 did in the context of the lacrosse play diagram file 900. Lines, such as lines 1020, 1030, identify movement for the vehicle objects 1010 in the same way as the lines in files 150, 900. In this context, solid line 1020 identifies movement of vehicle 4 before the impact/crash, and dashed line 1030 indicates the movement of that vehicle after the crash. Movement Parsing Method FIG. 2 shows that each of the offensive player elements 210-230 are physically connected to line segments, such as line segment 240 and arrow 242. In most football plays, lines such as arrow 242 are associated with a single identifiable player based on the location of the base of the arrow 242 (the base being the opposite end of the arrow 242 as the arrowhead). These lines indicate movement. Similar lines were shown as lines 950, 960 in the lacrosse play file 900 and lines 1020, 1030 in the automobile crash file 1000 of FIG. 10. The parsing engine 114 is responsible for identifying and interpreting these lines 240, 242, 950, 960, 1020, 1030 and associating them as identified movement 176 for one of the identified objects 174. In the examples shown in FIGS. 2, 9, and 10, different movement instructions are provided for different objects in the Figures.

The parsing engine 114 accomplishes this through the method 1100 shown in FIG. 11. The first step 1105 of this method is to locate any lines or line segments that start near an identified object 174. It should be remembered that the lines or line segments in the input files 150, 900, 1000 have been added to these input files to act as movement instructions for their associated objects.

When identified, that line segment is the associated with the object to which it is attached or is nearest in step 1110. FIGS. 12, 13, and 14 show object and line groupings 1200, 1300, 1400, respectively. In FIG. 12, line segment 1210 is connected to previously identified object 228. Thus, this line segment 1210 will be associated with object 228. Similarly, crooked line segment 1310 in FIG. 13 is associated with identified object 218, and the curved line segment 1410 is associated with object 222 (as shown in FIG. 14). Although each of these examples shows line segments near an offensive player 210-230 in FIG. 2, line segments could also be associated with defensive players 200. Such defensive line segments would also be identified in step 1105.

At step 1115, the line segments 1210, 1310, 1410 are traced to their ends, with the end being that part of the line segment furthest from the identified object. In some cases, the end of the line segment can then be associated with the start of another line segment, as is the case with line segment 1210 in FIG. 12. Line segment 1220 starts at the end of line segment 1210, making these two segments 1210, 1220 "connected line segments." Although this isn't the case in FIG. 12, this second line segment 1220 could end at the start of a third line segment, which may, in turn, end at the start of the fourth line segment, and so on. The process of tracing touching line segments in step 1115 is continued until no more line segments are found. All of the touching line segments found in this manner are then grouped together (as a group of line segments).

Each line segment group (which can consist of multiple segments 1210, 1220, or a single segment 1310 or 1410) is then be examined by method 1100. At step 1120, shape of the end is noted. Line grouping 1210, 1220 ends at arrowhead 1222, while line segments 1310 and 1410 end with perpendicular segment 1320, 1420, respectively. At step 1125, the shape of the grouping and line segments themselves are examined. For instance, line segments that traverse other line segments are noted, such as the line segments 1212 that traverse line segment 1210. The shapes of the segment groupings are also noted. Line segment 1310 has a zigzag shape, while line segment 1410 is curved. The color, width, and line type (solid, dashed, etc.) are also noted.

The information gathered at steps 1120 and 1125 is then parsed at step 1130 by comparing this data to the movement rules 184 in the rule set 180. FIG. 15 shows some sample content for these rules 184, with the line details from steps 1120, 1125 showing as the input 1510 to the rules 184, and the output 1520 defining the type of movement that is being represented. For example, the rules 184 shown in FIG. 15 indicate that a solid line represents movement of type-1, and a dashed line represents movement of type-2. A zig zag line shows movement of type-4. The line endings also are found as inputs into the rules 184, with an arrow ending, such as ending 1222 in FIG. 12, indicating that the movement is modified by modifier-1. A line segment line end, such as endings 1320 and ending 1420, indicates a modifier-3 applies.

The interpretation of these inputs depends on the content of the rules 184, which will be based on the type of file 150, 900, 1000 being input. In a football play 150, for instance, the different movement types in results 1520 may represent the timing of the movement, with a dashed line indicating movement before the snap and a solid line indicating movement after the snap. An arrowhead ending may indicate continued movement in a general direction, while a line segment line end indicates blocking. In some cases, the rules 184 may be dependent upon the associated identified object 174, with line types or endings having different meaning depending upon the associated object 174.

In a lacrosse play file 900, the dashed line 960 may indicate passing of the ball. In the automobile crash diagram file 1000, the solid line means movement before the crash and dashed lines indicate movement after the crash. The arrow heads in diagram file 1000 indicate continued movement, while the box ending indicate final resting position after the crash.

After the rules 184 are used to parse the line data into movement data, step 1135 stores the movement data as identified movements 176 in the data 170. Each identified movement 176 is stored in association with a particular identified object 174 to represent movements and actions of that object over time. The method then ends at step 1140. Populate Card Object The above descriptions and related figures show that the identified objects 174 and the identified movements 176 are stored as data elements in the data store 170. However, it is not necessary that these elements 174, 176 be permanently stored in the data store 170, or even stored within the separate data store 170 at all. That is because the data represented by the objects 174 and movements 176 will be incorporated in the card object 178 that will be stored in the data store 170, meaning that separate storage of objects 174 and movement 176 will be redundant.

FIG. 16 shows the method 1600 used by the parsing engine 114 for populating the card object 178. This object 178 is based on a class definition that, when instantiated, incorporates all elements of a play defined by the input file 150. The goal of this method 1600 is to take the data found in the identified objects 174 and identified movements 176 and use it to populate this data object 178.

Figure 17:
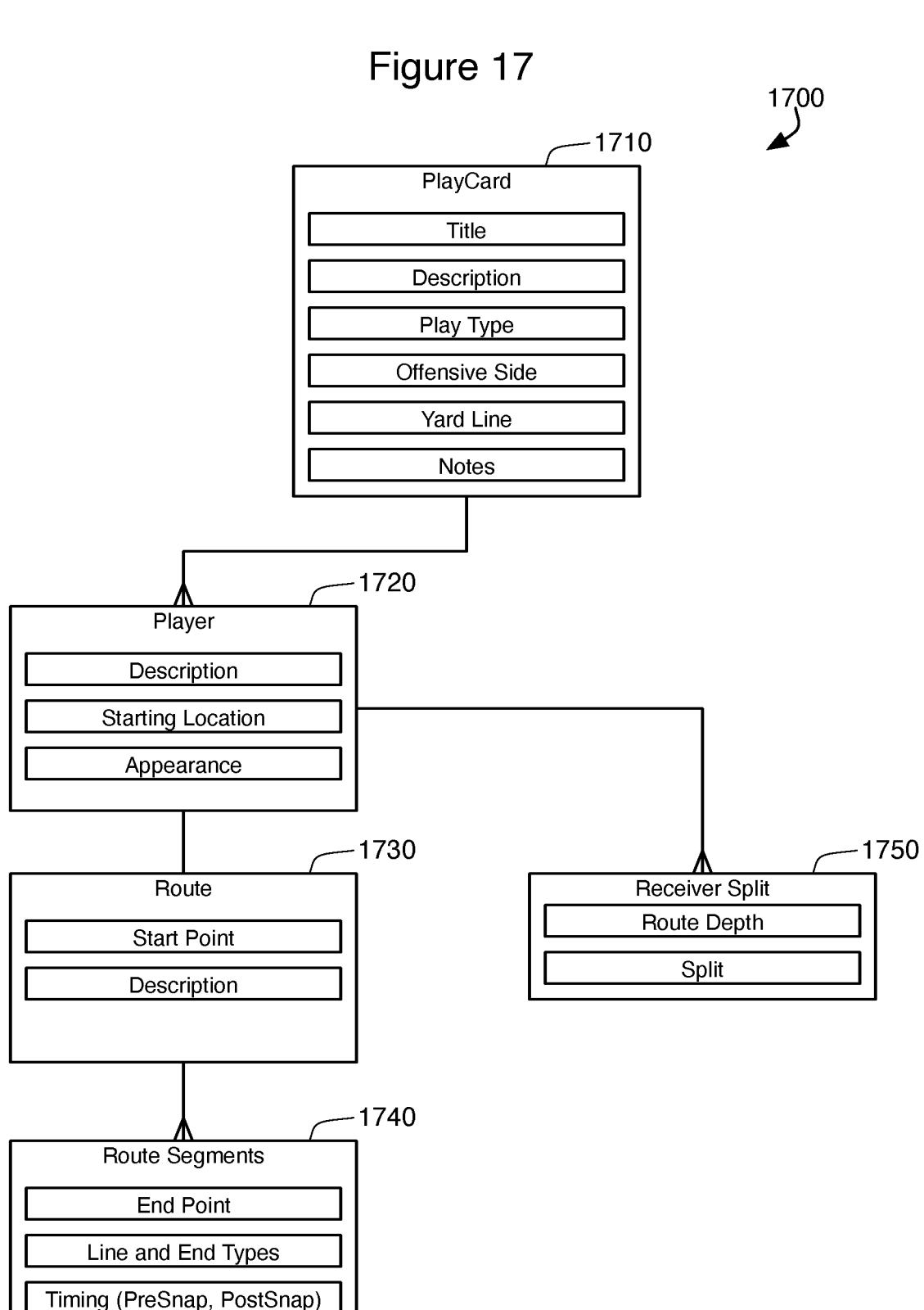
FIG. 17 is a schematic view of a first embodiment of a card data entity.

FIG. 17 shows one such structure 1700 for the card object 178. This structure 1700 is shown as a plurality of individual data objects 1710-1750, although the structure could easily be implemented as separate tables in a relational database. Consequently, each of the separate objects 1710-1750 shown in FIG. 17 can be generically considered separate data entities. Furthermore, there is no requirement that the card object 178 be implemented exactly as shown in FIG. 17 (or in FIG. 18), as alternative configurations of the data entities could be implemented with equivalent effect.

The primary data entity defining this structure is the playcard object 1710, which contains information about the input file 150 as a whole. As can be seen in FIG. 17, the playcard object contains textual information about the input file, including the title, description, and notes (which were determined at step 555, as explained above). Step 1605 populates this data in the playcard object 1710. The playcard object 1710 also contains information about the formation and overall type of play, which was determined by examining the grouping and movement of the plurality of objects 174 at step 320 and this information is populated by step 1610. Step 1615 adds data concerning the orientation or offensive side (determined at step 540) to the playcard object 1710. The setting or overall position of the play on the playfield can be determined by examining background data, such as yardage or field marking in a football play, similar to the field marking 902 shown in the lacrosse play.

Step 1620 populates a plurality of player objects 1720 based on the already identified objects 174. This will include both offensive and defensive players. The information about each player held by the player object 1720 includes the description of the player, such as their role or position on the team, and their starting location on the play, as indicated by the physical position of the graphic element representing the player in the input file 150. Their appearance is also recorded, which will be based on the appearance of that graphic element in the input file 150. The appearance may indicate, for instance, whether the player 1720 should be shaded or have a particular color.

Step 1625 populates the route 1730 and route segment 1740 objects based on the identified movements 176. Each movement for a player 1720 will have a single route object 1730, and the route object 1730 will point to one or more route segments 1740. The route object 1730 identifies the starting point and descriptive information about the route. The descriptive information could be retrieved from identifying textual information associated with the lines and arrows in the input file 150. Since the route object 1730 identifies only a starting position, it defines no movement. The movement is defined by the route segment objects 1740, which is why at least one segment 1740 is required for each route 1730. Each segment 1740 is associated with either the original route object 1730 or a previous segment 1740. It is possible to merely identify end points for each route segment 1740 since each segment 1740 is assumed to start at the ending point of the previous segment 1740 (or at the starting point of the route 1730). Each segment 1740 will contain additional information determined about the movement from applying rules 184 through method 1100. For instance, if a segment terminates in a line segment ending, the route segment 1740 will indicate that the segment will end in a blocking position. Movement types and timing are also identified through method 1100 and added to the route segment object 1740. A route segment might also be associate with type and timing information. The timing information may indicate which movement segments take place before an event, and which ones occur after the event. In the context of football plays, for example, the timing information can be associated with movement that takes place before the snap of the football (PreSnap) or after the snap (PostSnap).

In some embodiments, the input drawing 150 represents a real-life scenario such as players on a football fields (in FIG. 2) or cars at an intersection (in FIG. 10). But the drawings 150 itself does not accurately place the objects 174 in that drawing 150 perfectly to scale. For instance, the player icons in FIG. 2 may be larger than actual football players. The drawing 150 in FIG. 2 contains useful information about the relative position of the individual players, but the actual location of a player on the field may not be drawn to scale. In the context of a football play, horizontal information about the placement of wide players can be identified by their "split." This horizontal information can be based upon specific locations on a field, such as relative to the hash marks or to the numbers on the field. A "+3" value in a split might be three yards outside of the hash marks, or outside the numbers.

Because the input drawing may not be to scale, it may be necessary to extract or guess about the horizontal position or split of an object 174 in the drawing. Sometimes the data can be extracted from metadata embedded into a drawings 150, but other times the horizontal position is obtained through approximation based on what is known about the drawing. For example, the hash marks might be displayed in the input drawing 150 (not shown in FIG. 2), and, if the drawing 150 is actually to scale, the horizontal position in the real-world context can be examined through analysis of the horizontal position in the drawings. In another case, the drawing is not to-scale, but hashmarks are included and approximations are relatively easy to make. In a third case, no hashmarks are drawn, and approximations comprise simply a best guess as to the "split" of the objects 174.

The split of the objects 174 are stored in the embodiment shown in FIG. 17 in the ReceiverSplit class 1750 at step 1630. The object 174 may have a different split value at different moments in time, such as at the beginning of the play, and at the snapping of the ball. Thus, multiple splits 1750 can be assigned to a single object 174. There is a natural relationship between the split data 1750 and the starting location found in the player object 1720 and the route data found in objects 1730 and 1740. The "points" in these data objects 1720, 1730, 1740 can be considered to contain both X and Y coordinates that obviate the need for separate split data 1750.

In some embodiments, the split data 1750 contains textual information in a matter that is useful for the user of the system 100, which may find it helpful to know that this player is +3 from the numbers as opposed to having the system simply accurately tracking the player position without such textual split data. The method 1600 then ends at step 1635.

Figure 18:
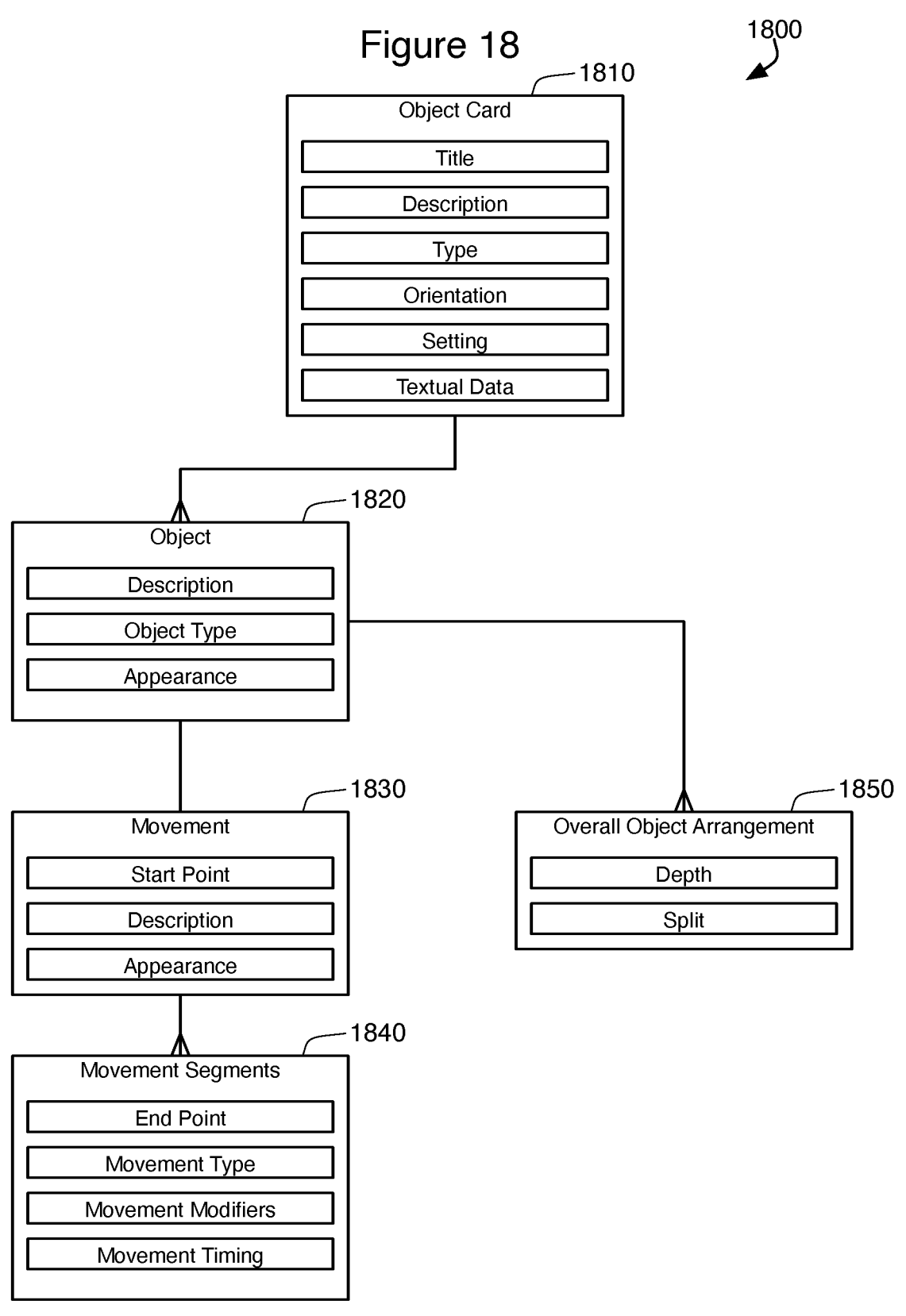
FIG. 18 is a schematic view of a second embodiment of a card data entity.

FIG. 18 shows a different object structure 1800 that is more generic than the object structure 1700 used to define football plays. This structure 1800 is still very similar, with an object card 1810 containing information about the input file 900, 1000, as a whole. Instead of players, the object card 1810 is associated with a plurality of generic objects 1820 which are populated using the identified objects 174. In the context of input file 1000, for example, these objects 1820 would represent automobiles. The objects 1820 are assigned to a movement object 1830, which is related to a plurality of movement segments 1840 in the same way each player 1720 was assigned to a route object 1730 and at least one route segment 1740. Element 1850 is an object that represents the specific, real-world object location in the same manner as element 1750.

Transform Engine and Method

Figure 19:
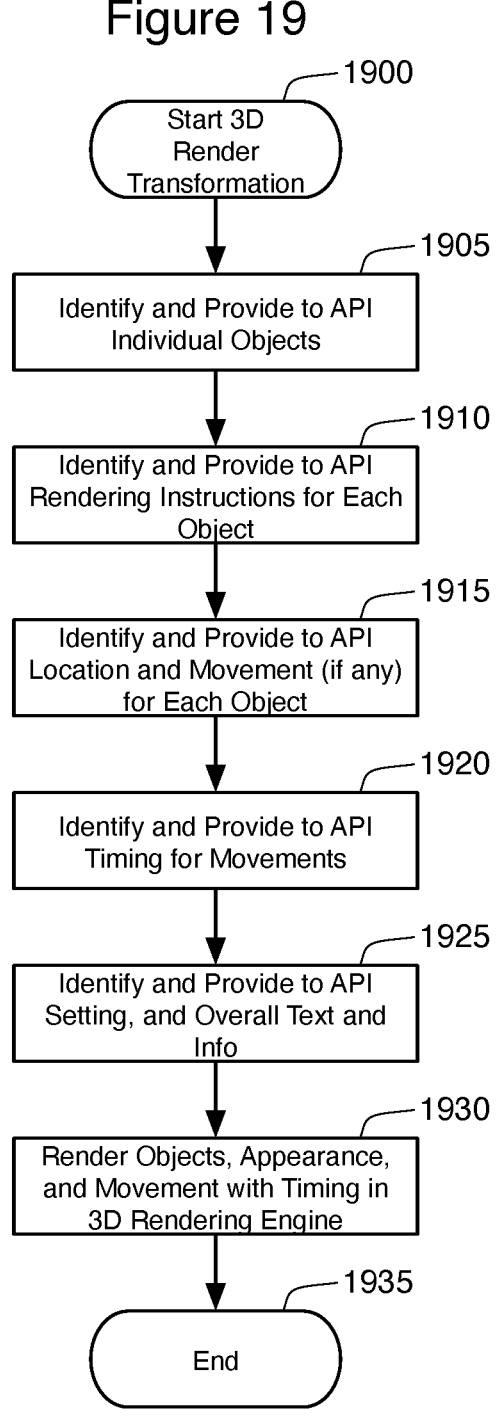
FIG. 19 is a flow chart showing a method of rendering a parsed vector graphics file.

Once the card object 178 is created and populated, the transform engine 116 is responsible for taking this object 178 and creating output files and data 192, 196. The method 1900 for performing this transformation is shown in FIG. 19. This method 1900 is made easier because the highly structured data of the card object 178 that separately defines a plurality of objects 174 and movements 174 specific to those objects 174. The method 1900 shown in FIG. 19 assumes that the transform engine 116 will provide API data 192 through an API interface of a 3-D rendering engine 190. It should be clear to one of ordinary skill that the transform engine could easily transform this data in the object 178 to any format or platform, included ByteCubed, 3D Models, or even back into 2-D formats such as Visio or PowerPoint.

The process of parsing and transformation opens up new possibilities for rendering based on these different downstream graphic engines. ByteCubed, for instance, could read and display an SVG image directly, but if presented only the SVG image the software will not understand what image elements represent players in a play and what image elements represent a route for an individual player. The parsing engine 114 and the generated card object 178 allows the transform engine 116 to present data 192 to, for example, the ByteCubed graphics engine 190 in a much more effective manner, where individual players are uniquely identified, and movement image elements are transformed into movement in the ByteCubed software.

The method 1900 start at step 1905, where the transform engine 116 identifies the individual players 1720 or objects 1820 in the card object 178 and presents them at API data 192 to the graphics engine 190 as individual objects. Step 1910 allows the transform engine 116 to define the rendering instructions that define the appearance for each object in the 3-D rendering engine 190 according to the rules governing the API input data 192. The color or shading for each object 1720, 1820, for example, can be customized based on the color or shading of the 2-D object 174 identified by the parsing engine 114 in the input file 150, 900, 1000. Similarly, the 3-D shape of the individual objects can be based on the 2-D representation of the objects in the input file 150, 900, 1000. For instance, circles could appear as spheres, squares as cubes, and rectangles as cuboids. The heights of these objects could be based on the relative widths and lengths of the representation, such that circles and squares become perfect spheres and cubes, and rectangles become cuboids of a height equal to their shortest side. 3-D representations that bear no resemblance to the 2-D graphic shapes in the input file 150 are also possible. If input file 1000 is known to represent automobiles, for example, a 3-D representation of an automobile could be specified in the API data 192 instead of a cuboid. The shape of the objects as rendered could also be based upon the object types assigned to the objects by the parsing engine 114 regardless of the color or shape of the object in the original 2-D input file 150, with different object types being shown in different colors, or shapes, or both. Method 1900 does not create these representations, as they are created by the 3-D rendering engine 190. Rather, the method 1900 merely provides instructions to the 3-D rendering engine 190 (such as 'render a blue sphere of these dimensions' or 'render a red automobile' with these specifications), with the details determined by the 3-D rendering engine 190.

In one embodiment, step 1910 is used to change the appearance of an object 174 (players 1720 or objects 1820) depending on the current route or movement segment 1740, 1840. For example, a football player object 1720 might be represented using a first 3-D graphic during a first route segment 1740, and a second 3-D graphic during a second route segment 1740. This could be based on the movement types for the segments 1740, 1840 as identified by rules 184. The graphic could also change at the end of the segment 1740, 1840 when the timing for that segment has ended, and this change could be governed by the segment end. A segment with a blocking line segment end, such as segments 1310 and 1420 with ends 1320, 1420, respectively, could cause one 3-D graphic to be displayed during movement, and another to be displayed showing a blocking character or graphic at the end of the movement. It is the parsing engine 114 and the resulting card object 178 that allows these types of creative possibilities to be implemented by the transform engine 116.

At step 1915, location information is provided for each object identified in step 1905, and movement parameters are provided for one or more of the objects. The movement parameters are based on the routes 1730 and route segments 1740 (or movements 1830 and movement components 1840) identified in the card object 178. This movement will likely be limited to movement in a 2-dimensional (2D) plane since this movement is based on elements in a 2-D graphic input file 150. However, this does not need to be the case. For example, the input file 150 may represent movement of one or more airplanes. Each line segment/arrow shown in the input file 150 may show a 2-D path, but the ending of the segments may include textual data (or embedded meta data related to the graphic object) that specifies altitude at the end of that segment. This brings a third dimension into the identified movements 176, which could then be stored into the card object 178. In this context, the movement parameters provided at step 1915 will define 3-dimensional movement patterns for the identified objects.

At step 1920, the transform engine 116 will provide timing information for the movement data provided at step 1915. As explained above, separate timing information can be stored in the individual route segments 1740 or movement components 1840. This timing information will then be used by the 3-D rendering engine 190 to control the timing of the rendered movement of each object. And, as explained above, this timing information could be used to control the 3-D representation of the objects as they move from segment 1740, 1840 to segment 1740, 1840.

At step 1925, textual data, setting or background data, and other information can be provided to the 3-D engine 190 via the API data 192. This data may be displayed by the engine 190 next applied to a rendered player 1720 or object 1820, or even on the player 1720 or object 1820 itself. Alternatively, the data may relate to the overall playcard 1710 or object card 1810, and the engine 190 can display the text as part of the environment for the rendered objects.

At step 1930, the 3-D graphics engine 190 takes the API data 192 and renders the players 1720 or objects 1820, alters their appearance as indicated by the transform engine 116, places them in the defined setting, and renders their movement according to the submitted parameters. Routes 1730 for each player 1720 or movement 1830 for each object 1820 will cause the 3D representations of players and objects to move from their initially assigned positions at the appropriate times. Information about the setting will be displayed (such as the yard line and play title from FIG. 2, or the intersection from FIG. 10) to provide context to the objects and their movement. The method 1900 then ends at step 1935.

In this way, the transform engine 116 converts the card data from FIGS. 17 and 18 into a format the 3-D engine 190 can render. This system 100 thus allows functionality for users to build 2D images in relatively simple graphics programs, such as Microsoft Visio & Power Point, and then have these images transformed to a 3D experience that will enhance the end product and provide a new layer of seamless technology that does not currently exist.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
a) identifying a vector graphics file containing graphic elements;
b) identifying, using a plurality of rules, objects that are represented as graphic elements in the vector graphics file;
c) identifying locations of the objects in the vector graphics file;
d) identifying movement instructions that are represented as line segment groups in the vector graphics file;
e) associating the movement instructions with particular objects based on a proximity of a base of each of the line segment groups with one of the particular objects, wherein the movement instructions for a first object differs from the movement instructions for a second object, further wherein a first line segment group associated with the first object comprises a first line segment connected to a second line segment, and further wherein a second line segment group for the second object terminates at a line termination element;
f) applying the plurality of rules to details of the first line segment to identify a first movement timing for the first line segment that occurs before an event;
g) applying the plurality of rules to details of the second line segment to identify a second movement timing for the second line segment that occurs after the event;
h) populating a data structure that specifies, for the vector graphics file, the objects, the locations for the objects, and the movement instructions associated with the objects, wherein the movement instructions include the movement timings;
i) submitting instructions to a 3-D graphics engine by:
i) submitting the locations of the objects,
ii) submitting rendering instructions for the objects, and
iii) submitting movement parameters for the particular objects based on the movement instructions; and
j) rendering the objects at the 3-D graphics engine to show separate movements for the first object and the second object based on the submitted movement parameters, wherein the rendering reflects the movement timings, and further wherein the plurality of rules associates the line termination element with a movement modifier that alters the rendering of the second object by the 3-D graphics engine upon a completion of the movement for the second object.

2. The method of claim 1, further comprising classifying the objects into at least two object types, wherein the rendering instructions for the objects differs based on the object types of the objects.

3. The method of claim 2, wherein the rendering instructions distinguish between the object types by color or shape.

4. The method of claim 2, wherein the plurality of rules relates shapes of the graphic elements in the vector graphics file with the object types.

5. The method of claim 2, wherein the plurality of rules relates a first position of the first object with a first object type, and relate a second position of the second object with a second object type.

6. The method of claim 5, wherein the second position is a relative position of the second object relative to the first position of the first object.

7. The method of claim 2, wherein a subset of the plurality of rules defines configuration rules for allowed configurations of the graphic elements in the vector graphics file, wherein the configuration rules are used to define the object types.

8. The method of claim 7, further comprising grouping the graphic elements in the vector graphics file by position and dividing the graphic elements by size in order to apply the configuration rules to define the object types.

9. The method of claim 8, wherein the graphic elements are grouped by position along a single axis in the vector graphics file as part of the step of grouping the graphic elements in the vector graphics file by position.

10. The method of claim 1, wherein the data structure associates a movement data entity with each object, further wherein each movement data entity is associated with one movement segment data entity for each line segment in the line segment groups found in the vector graphics file.

11. The method of claim 1, wherein the vector graphics file is a 2-D scalable vector graphics (SVG) file.

12. The method of claim 11, further comprising converting the SVG file into a simplified file using pre-processing, wherein the step of identifying the objects represented graphically in the vector graphics file comprises examining the simplified file for the objects represented graphically.

13. A method comprising:

a) identifying a vector graphics file containing graphic elements;

b) identifying, using a plurality of rules, objects that are represented as graphic elements in the vector graphics file, wherein a subset of the plurality of rules defines configuration rules for allowed configurations of the graphic elements in the vector graphics file;

c) classifying the objects into at least two object types, wherein the configuration rules are used to define the object types by grouping the graphic elements in the vector graphics file by position and dividing the graphic elements by size;

d) identifying locations of the objects in the vector graphics file;

e) identifying movement instructions that are represented as line segment groups in the vector graphics file;

f) associating the movement instructions with particular objects based on a proximity of a base of each of the line segment groups with one of the particular objects, wherein the movement instructions for a first object differs from the movement instructions for a second object, further wherein a first line segment group associated with the first object comprises a first line segment connected to a second line segment;

g) applying the plurality of rules to details of the first line segment to identify a first movement timing for the first line segment that occurs before an event;

h) applying the plurality of rules to details of the second line segment to identify a second movement timing for the second line segment that occurs after the event;

i) populating a data structure that specifies, for the vector graphics file, the objects, the locations for the objects, and the movement instructions associated with the objects, wherein the movement instructions include the movement timings;

j) submitting instructions to a 3-D graphics engine by:
   i) submitting the locations of the objects,
   ii) submitting rendering instructions for the objects, and
   iii) submitting movement parameters for the particular objects based on the movement instructions; and k) rendering the objects at the 3-D graphics engine to show separate movements for the first object and the second object based on the submitted movement parameters, wherein the rendering reflects the movement timings, and wherein the rendering instructions for the objects differs based on the object types of the objects.

14. The method of claim 13, wherein the graphic elements are grouped by position along a single axis in the vector graphics file as part of the step of grouping the graphic elements in the vector graphics file by position.

* * * * *